US012753906B2

(12) United States Patent
Meltzer

(10) Patent No.: US 12,753,906 B2
(45) Date of Patent: Oct. 6, 2026

(54) LIGHT FIXTURE INCLUDING A THREE-BAR FRAME SOLVER FOR SHUTTER CONTROL

(71) Applicant: Electronic Theatre Controls, Inc., Middleton, WI (US)

(72) Inventor: Noah Meltzer, Middleton, WI (US)

(73) Assignee: Electronic Theatre Controls, Inc., Middleton, WI (US)

(*) Notice: Subject to any disclaimer, the term of this patent is extended or adjusted under 35 U.S.C. 154(b) by 0 days.

(21) Appl. No.: 19/092,708

(22) Filed: Mar. 27, 2025

(65) Prior Publication Data

US 2026/0298444 A1 Oct. 1, 2026

(51) Int. Cl.
*F21V 14/08* (2006.01)
*F21V 11/18* (2006.01)
(Continued)

(52) U.S. Cl.
CPC ............... *F21V 14/08* (2013.01); *F21V 11/18* (2013.01); *F21V 11/183* (2013.01); (Continued)

(58) Field of Classification Search
CPC . F21W 2131/406; F21V 14/08; F21V 14/085; F21V 11/18; F21V 11/183; F21V 11/186; G02B 26/023; G02B 5/005
See application file for complete search history.

(56) References Cited

U.S. PATENT DOCUMENTS 9,366,415 B2 6/2016 Jurik et al.
9,664,361 B2 * 5/2017 Hansen ................ F21S 10/007
(Continued)

FOREIGN PATENT DOCUMENTS

CN 108426233 A * 8/2018 ................ F21V 1/10
CN 119468109 A 2/2025
(Continued)

OTHER PUBLICATIONS

Machine translation of CN-108426233-A retrieved from the FIT database of PE2E search. (Year: 2026).*
(Continued)

*Primary Examiner* — Colin J Cattanach
(74) *Attorney, Agent, or Firm* — Michael Best & Friedrich LLP

(57) ABSTRACT

A light fixture including a housing, a light source, a framing shutter system, and an electronic processor. The framing shutter system includes a framing shutter gate, a framing shutter blade, and a plurality of framing shutter motors. The electronic processor is connected to the light source and the framing shutter system. The electronic processor is configured to determine a desired orientation of the framing shutter blade, determine whether the desired orientation is within a gamut of the framing shutter blade, determine, in response to the desired orientation being outside of the gamut of the framing shutter blade, an adjusted orientation of the framing shutter blade, the adjusted orientation of the framing shutter blade corresponding to an orientation for the framing shutter blade that is as close as possible to the desired orientation, and control the plurality of framing shutter motors to move the framing shutter blade to the adjusted orientation.

20 Claims, 15 Drawing Sheets

(51) Int. Cl.

| | |
|---|---|
| ***F21W 131/406*** | (2006.01) |
| ***G02B 5/00*** | (2006.01) |
| ***G02B 26/02*** | (2006.01) |

(52) U.S. Cl.

CPC ........... *F21V 11/186* (2013.01); *F21V 14/085* (2013.01); *F21W 2131/406* (2013.01); *G02B 5/005* (2013.01); *G02B 26/023* (2013.01)

(56) References Cited

U.S. PATENT DOCUMENTS

| | | | | |
|---|---|---|---|---|
| 2018/0368217 A1* | 12/2018 | Toft | ........................ | F21S 10/02 |
| 2022/0357018 A1* | 11/2022 | Jurik | ......................... | F21V 9/08 |
| 2023/0151947 A1* | 5/2023 | Jensen | ................ | F21V 23/0457 362/276 |
| 2024/0418349 A1* | 12/2024 | Jurik | ..................... | F21S 10/007 |

FOREIGN PATENT DOCUMENTS

| | | | | |
|---|---|---|---|---|
| JP | 2006053409 A | 2/2006 | | |
| WO | WO-2015057235 A1 * | 4/2015 | .............. | F21V 14/08 |

OTHER PUBLICATIONS

MAC Ultra Performance User Guide and Safety/Installation Manual, Martin, Harman Professional Denmark ApS, publication date unknown (95 pages).

Relevé Spot Service Manual, ETC, released 2024 (156 pages).

Robin T2 User Manual, Robin Innovative Technology, Robe Li version 2.9, publication date unknown (68 pages).

United Kingdom Intellectual Property Office for Application No. 2601328.4 dated Aug. 21, 2026 (5 pages).

* cited by examiner

LIGHT FIXTURE INCLUDING A THREE-BAR FRAME SOLVER FOR SHUTTER CONTROL

FIELD

Embodiments described herein provide light fixtures and methods for controlling the light fixtures.

SUMMARY

Embodiments described herein relate to techniques for controlling three-bar frame systems that are more effective than existing techniques. Existing techniques for controlling three-bar frame systems often use what is referred to as "A/B" control. Using an A/B control scheme, a user or a light fixture sets an angle of a first arm and an angle of a second arm individually in order to move a framing shutter blade to a desired orientation. The A/B control scheme is a less intuitive way to set the desired orientation of the framing shutter blade. In contrast to the A/B control scheme, embodiments described herein utilize a control scheme where an angle value of the framing shutter blade and a thrust value of the framing shutter blade are used to control the orientation of the framing shutter blade. The thrust-angle control scheme provides a more intuitive control of the framing shutter blade. Further, by utilizing the thrust-angle control scheme, either the inverse kinematics or the forward kinematics of the framing shutter blade can be used (e.g., in a cost function) to optimize control of the framing shutter blade in the event that a desired thrust-angle is outside the gamut of the framing shutter blade.

Light fixtures described herein include a housing, a light source, a framing shutter system, and an electronic processor. The framing shutter system includes a framing shutter gate, a framing shutter blade, and a plurality of framing shutter motors connected to the framing shutter blade. The electronic processor is electrically connected to the light source and the framing shutter system. The electronic processor is configured to determine a desired orientation of the framing shutter blade, determine whether the desired orientation is within a gamut of the framing shutter blade, determine, in response to the desired orientation being outside of the gamut of the framing shutter blade, an adjusted orientation of the framing shutter blade, the adjusted orientation of the framing shutter blade corresponding to an orientation for the framing shutter blade that is as close as possible to the desired orientation, and control the plurality of framing shutter motors to move the framing shutter blade to the adjusted orientation.

In some aspects, the desired orientation of the framing shutter blade is defined by a thrust value and an angle value.

In some aspects, the thrust value corresponds to a location of a virtual pivot point within the framing shutter gamut.

In some aspects, the angle value corresponds to how far the framing shutter blade is rotated about a virtual pivot point.

In some aspects, the angle value is assigned an angle-thrust weight.

In some aspects, the angle-thrust weight is user selectable.

In some aspects, the angle-thrust weight is automatically selected.

Methods described herein for controlling a light fixture include determining, using an electronic processor, a desired orientation of a framing shutter blade, determining, using the electronic processor, whether the desired orientation is within a gamut of the framing shutter blade, determining, using the electronic processor and in response to the desired orientation being outside of the gamut of the framing shutter blade, an adjusted orientation of the framing shutter blade, the adjusted orientation of the framing shutter blade corresponding to an orientation for the framing shutter blade that is as close as possible to the desired orientation, and controlling, using the electronic processor, a plurality of framing shutter motors to move the framing shutter blade to the adjusted orientation.

In some aspects, the desired orientation of the framing shutter blade is defined by a thrust value and an angle value.

In some aspects, the thrust value corresponds to a location of a virtual pivot point within a framing shutter gate.

In some aspects, the angle value corresponds to how far the framing shutter blade is rotated about a virtual pivot point.

In some aspects, the angle value is assigned an angle-thrust weight.

In some aspects, the angle-thrust weight is user selectable.

In some aspects, the angle-thrust weight is automatically selected.

In some aspects, the electronic processor further configured to determine the adjusted orientation using a non-analytical solver.

In some aspects, the non-analytical solver is configured to minimize a cost function when determining the adjusted orientation.

In some aspects, the non-analytical solver is a gradient descent algorithm.

Light fixtures described herein include a housing, a light source, a framing shutter blade system, and an electronic processor. The framing shutter blade system includes a first arm, a second arm, a framing shutter blade including a first blade slot configured to receive the first arm in a slidable manner and a second blade slot configured to receive the second arm in a slidable manner, a first framing shutter motor including a first output shaft, the first framing shutter motor being connected to the first arm via the first output shaft, and a second framing shutter motor including a second output shaft, the second framing shutter motor being connected to the second arm via the second output shaft. The electronic processor is electrically connected to the light source and the framing shutter blade system. The electronic processor is configured to receive a desired angle of the framing shutter blade, receive a desired thrust of the framing shutter blade, determine a desired orientation based on the desired angle and the desired thrust, determine whether the desired orientation is within a gamut of the framing shutter blade, determine, in response to the desired orientation being outside of the gamut of the framing shutter blade, an adjusted orientation of the framing shutter blade, the adjusted orientation of the framing shutter blade corresponding to an orientation for the framing shutter blade that is as close as possible to the desired orientation, and adjust the first arm and the second arm by controlling the first framing shutter motor and the second framing shutter motor to move the framing shutter blade to the adjusted orientation.

In some aspects, the electronic processor is further configured to assign an angle-thrust weight to the desired angle of the framing shutter blade.

In some aspects, the angle-thrust weight is automatically selected.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

Other aspects of the embodiments will become apparent by consideration of the detailed description and accompanying drawings.

DETAILED DESCRIPTION

Light fixtures described herein include a housing, a light source, a framing shutter system, and an electronic processor. The framing shutter system includes a framing shutter gate, a framing shutter blade, and a plurality of framing shutter motors connected to the framing shutter blade. The electronic processor is electrically connected to the light source and the framing shutter system and is configured to determine a desired orientation (e.g., a desired thrust and a desired angle) of the framing shutter blade and determine whether the desired orientation is within a gamut of the framing shutter blade. If the desired orientation is outside of the gamut of the framing shutter blade, an adjusted orientation of the framing shutter blade is determined. The adjusted orientation of the framing shutter blade corresponds to an orientation for the framing shutter blade that is as close as possible (e.g., as defined by a cost function and angle-thrust weight) to the desired orientation. The plurality of framing shutter motors can then be controlled to move the framing shutter blade to the adjusted orientation.

Figure 1:
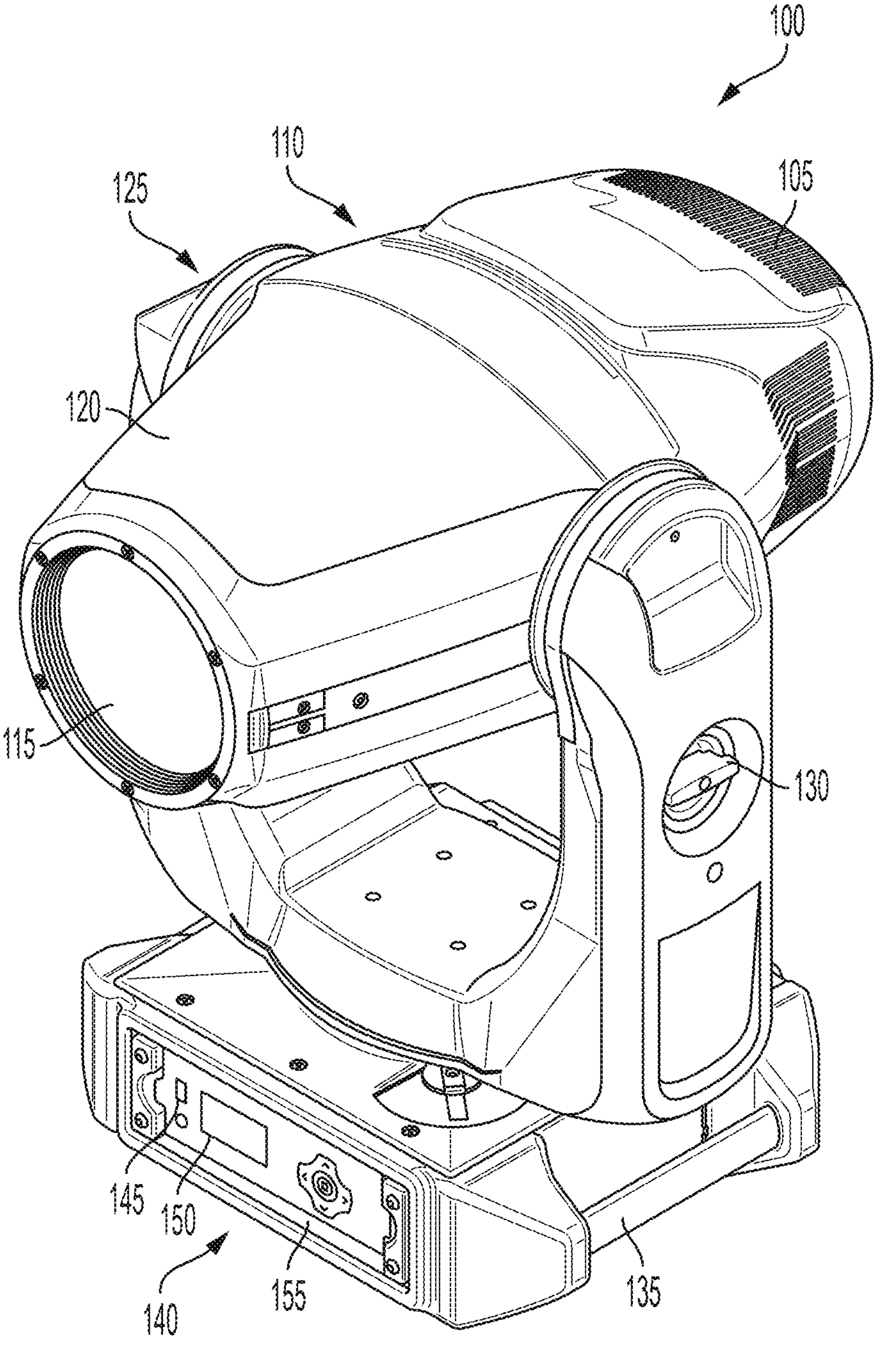
FIG. 1 illustrates a light fixture, according to embodiments described herein.

FIG. 1 illustrates a light fixture 100. Light fixture 100 includes a light module rear cover 105. In some embodiments, the light module rear cover 105 contains a light module 350 (see FIG. 3) that includes a light source, a driver board, a reflector, and a fan assembly. The light source is, for example, an array of light emitting diodes ("LEDs"). Light fixture 100 also includes a housing 110 and a front lens 115. In some embodiments, the front lens 115 is configured to guide light from the light source contained by the light module rear cover 105. The light fixture 100 also includes a head 120. As a component of the housing 110, the head 120 is configured to contain an optics module 340 (see FIG. 3). Additionally, the light fixture 100 includes a yoke arm cover 125 configured to contain a yoke assembly configure to change an angle of tilt of the head 120 of the light fixture 100. In some embodiments, the yoke assembly contained by yoke arm cover 125 is configured to allow the light fixture 100 to be mounted on an external surface. The yoke arm cover 125 further includes a tilt lock 130 configured to lock the light fixture at a specific angle of tilt. Light fixture 100 includes a handle 135 configured to allow the light fixture 100 to be carried or attached to an external surface. Light fixture 100 also includes a control module 140 configured as a user interface for controlling, for example, various settings of the light fixture 100. The control module 140 further includes a USB port 145, a display 150, and navigation buttons 155.

Figure 2:
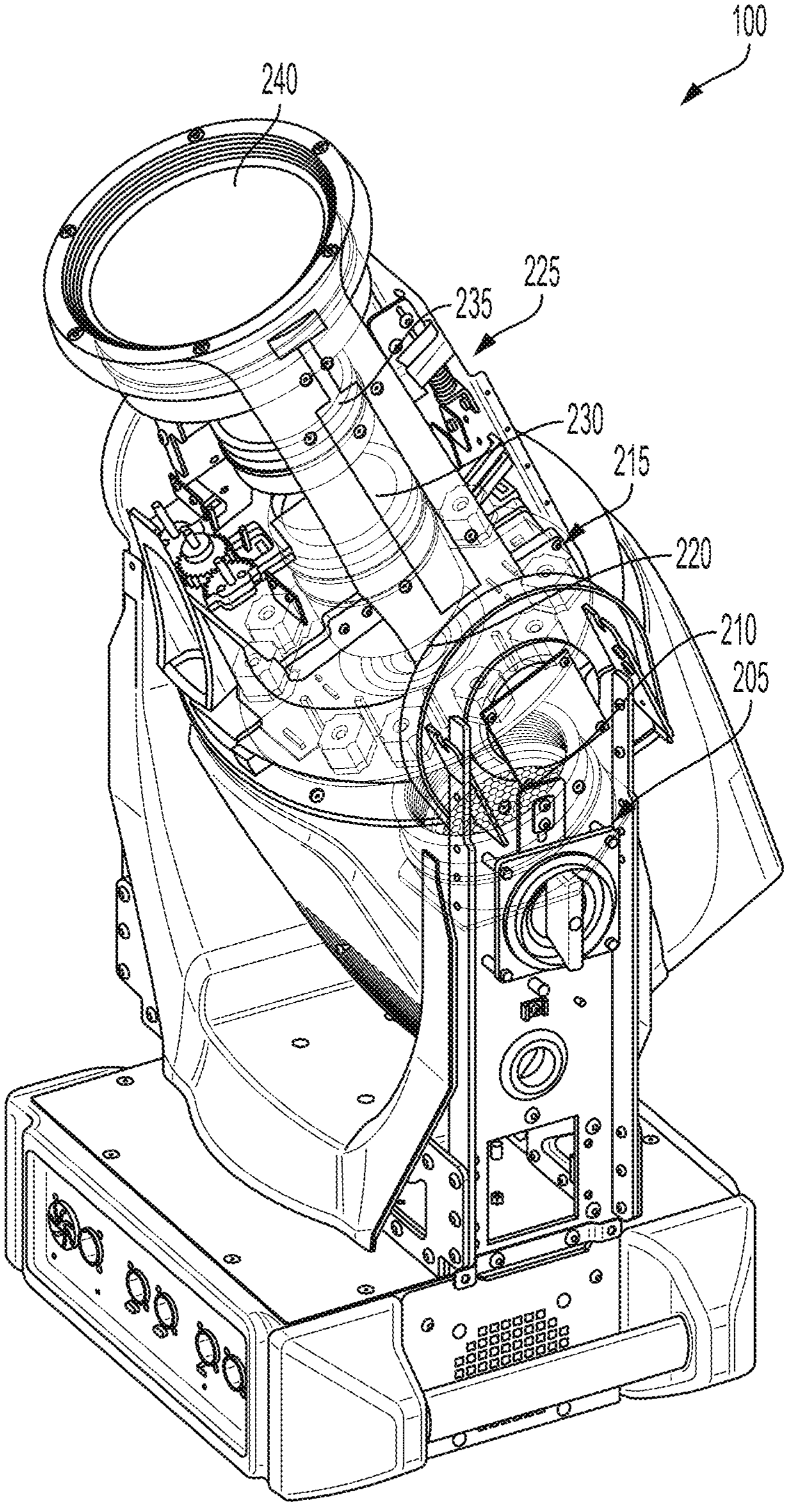
FIG. 2 illustrates the light fixture of FIG. 1 with a portion of a housing removed, according to embodiments described herein.

FIG. 2 illustrates the light fixture 100 with a portion of the housing 110 removed to expose internal components of the light fixture 100. The light fixture 100 includes a light module 205 including a light source 210. As previously described, the light source 210 can be an array of LEDs. The light fixture 100 also includes a framing shutter system 215 configured to control the shape of a gate 220. The gate 220 is included in the framing shutter system 215. The light fixture 100 further includes an optics module 225. The optics module 225 includes a focus lens 230 and zoom lens 235. Light fixture 100 further includes a front lens 240.

Figure 3:
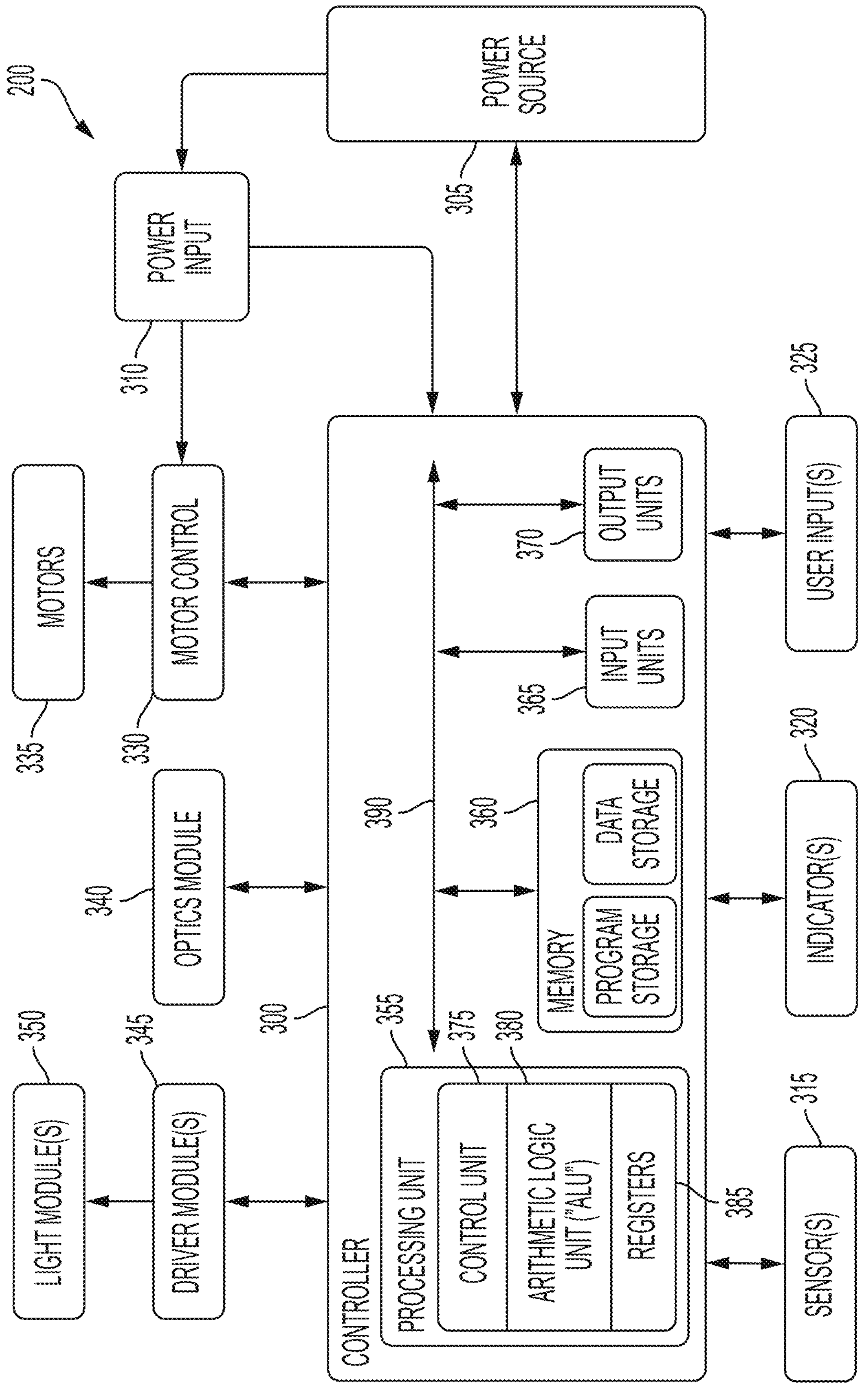
FIG. 3 illustrates a control system for the light fixture of FIG. 1, according to embodiments described herein.

FIG. 3 illustrates a control system for controlling the light fixture 100. The control system includes a controller 300. The controller 300 is electrically and/or communicatively connected to a variety of modules or components of the light fixture 100. For example, the controller 300 is connected to a power source 305, power input module 310, one or more sensors or sensing circuits 315, one or more indicators 320, a user input module 325, a motor control module 330, a plurality of framing shutter motors 335, an optics module 340, one or more driver modules 345, and one or more light modules 350. The controller 300 includes combinations of hardware and software that are operable to, among other things, control the operation of the light fixture 100, monitor a condition of the light fixture 100, control operation of the framing shutter system 215, etc.

The controller 300 includes a plurality of electrical and electronic components that provide power, operational control, and protection to the components and modules within the controller 300 and/or the light fixture 100. For example, the controller 300 includes, among other things, a processing unit 355 (e.g., a microprocessor, a microcontroller, an electronic controller, and electronic processor, or another suitable programmable device), a memory 360, input units 365, and output units 370. The processing unit 355 includes, among other things, a control unit 375, an arithmetic logic unit ("ALU") 380, and a plurality of registers 385 (shown as a group of registers in FIG. 3) and is implemented using a known computer architecture (e.g., a modified Harvard architecture, a von Neumann architecture, etc.). The processing unit 355, the memory 360, the input units 365, and the output units 370, as well as the various modules or circuits connected to the controller 300 are connected by one or more control and/or data buses (e.g., common bus 390). The control and/or data buses are shown generally in FIG. 3 for illustrative purposes. The use of one or more control and/or data buses for the interconnection between and communication among the various modules, circuits, and components would be known to a person skilled in the art in view of the disclosure provided herein.

The memory 360 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 355 is connected to the memory 360 and executes software instructions that are capable of being stored in a RAM of the memory 360 (e.g., during execution), a ROM of the memory 360 (e.g., on a generally permanent basis), or another non-transitory computer readable medium such as another memory or a disc. Software included in the implementation of the light fixture 200 can be stored in the memory 360 of the controller 300. The software includes, for example, firmware, one or more applications, program data, filters, rules, one or more program modules, and other executable instructions. The controller 300 is configured to retrieve from the memory 360 and execute, among other things, instructions related to the control processes and methods described herein. In other constructions, the controller 300 includes additional, fewer, or different components.

Power provided by power source 305 to the light fixture 100 is provided through the power input module 310. The power input module 310 includes combinations of active and passive components to regulate or control the power received from the light fixture 100 prior to power being provided to the controller 300.

The indicators 320 include, for example, one or more light-emitting diodes ("LEDs"). The indicators 320 can be configured to display conditions of, or information associated with, the light fixture 100. For example, the indicators 320 are configured to indicate measured characteristics of the light fixture 100 (e.g., pan angle, tilt angle, etc.), the status of the light fixture 100, etc. The user input module 325 is operably coupled to the controller 300 to, for example, turn on the light fixture 100. In some embodiments, the user input module 325 includes a combination of digital and analog input or output devices required to achieve a desired level of operation for the light fixture 100, such as one or more knobs, one or more dials, one or more switches, one or more buttons, etc. In some embodiments, the user input module 325 includes the control module 140 of FIG. 1.

Figure 4A:
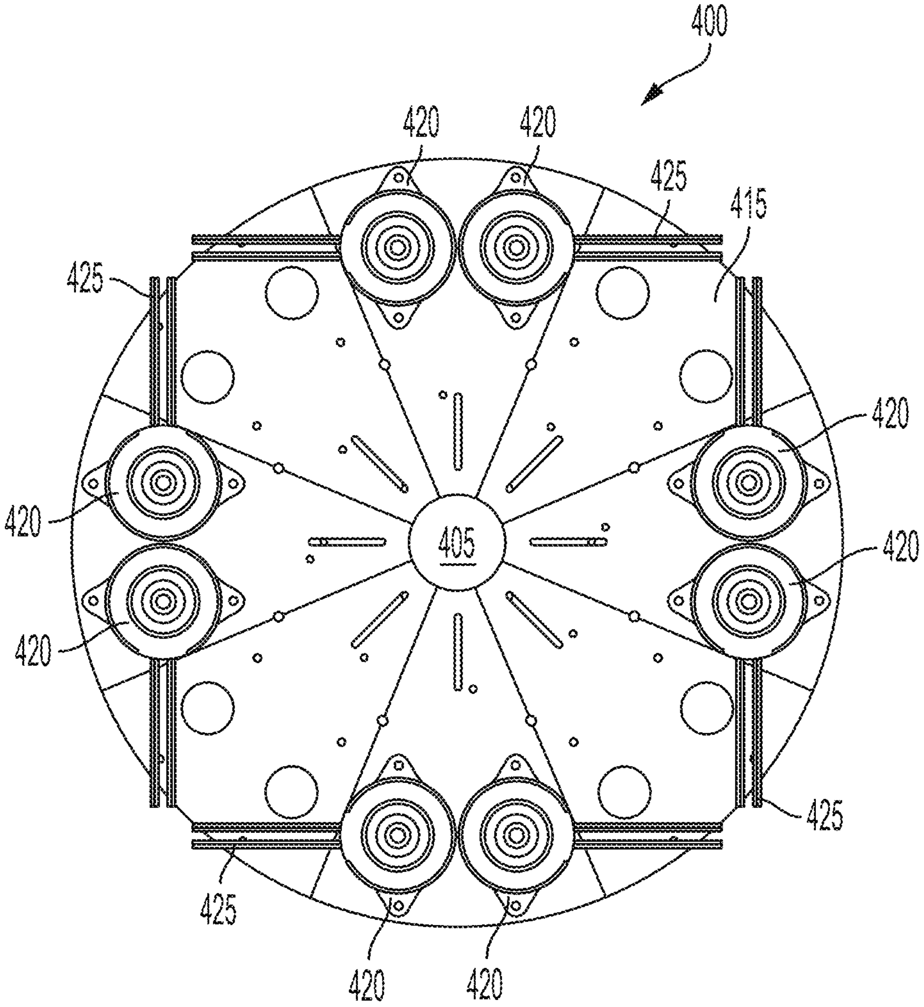
FIG. 4A illustrates a framing shutter system, according to embodiments described herein.

FIG. 4A illustrates a framing shutter system 400 including an open framing shutter gate 405. Regarding FIGS. 4A and 4B, the framing shutter system 400 includes a wheel 415 and a plurality of framing shutter motors 420. The plurality of framing shutter motors 420 are configured to be at least partially fixed to the wheel 415 and are used to control the position of four framing shutter blades. Additionally, the plurality of framing shutter motors 420 are at least partially fixed to a support portion 425 in order to provide additional structural support to the framing shutter system 400.

Figure 4B:
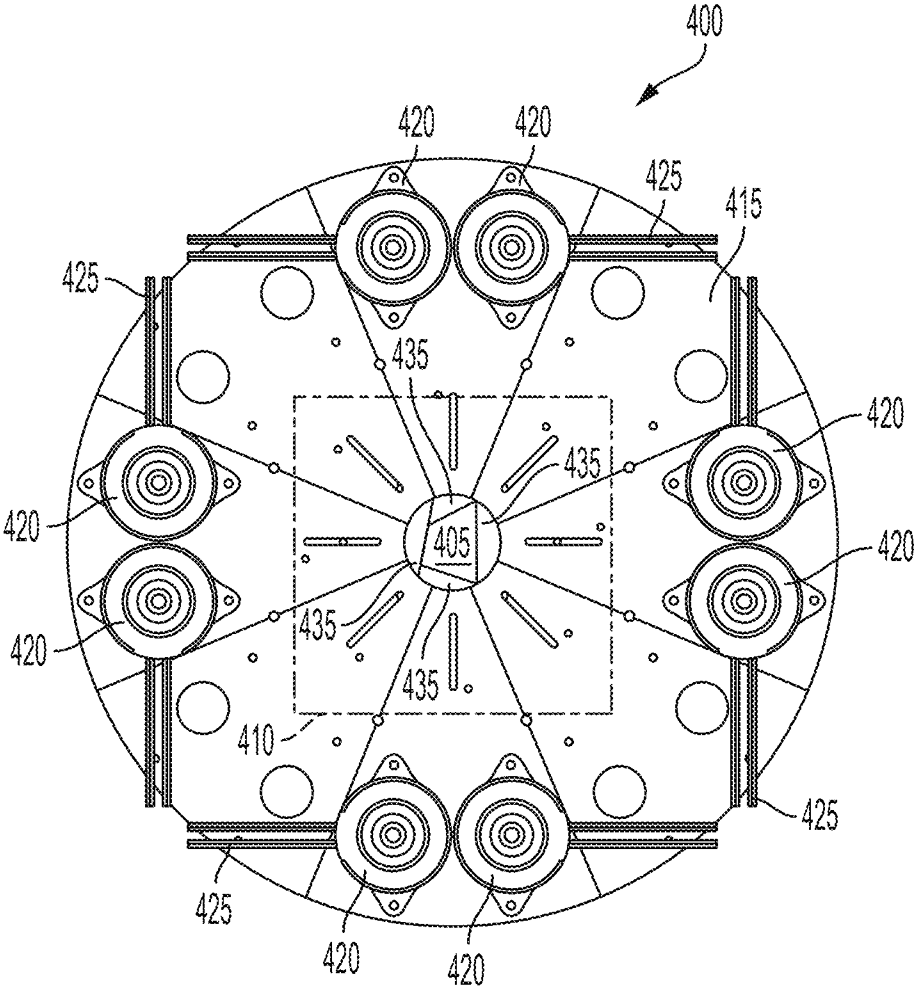
FIG. 4B illustrates a framing shutter system, according to embodiments described herein.

FIG. 4B illustrates the framing shutter system 400 including a partially closed framing shutter gate 405. The partially closed framing shutter gate 405 is partially closed due to framing shutter blades 435. The plurality of framing shutter motors 420 is connected to the framing shutter blades 435. An orientation of the framing shutter blades 435 is controlled by a controller (e.g., controller 300) using the plurality of framing shutter motors 420. Changing the orientation of the framing shutter blades 435 allow light to pass through the framing shutter gate 405 in various manners, which means that various shapes can be created with the light passing through the framing shutter gate 405. In some embodiments, the framing shutter system 400 includes four framing shutter blades 435, each operated by two of the plurality of framing shutter motors 420. In some embodiments, the framing shutter blades 435 have two degrees of freedom (e.g., thrust and angle).

Figure 4C:
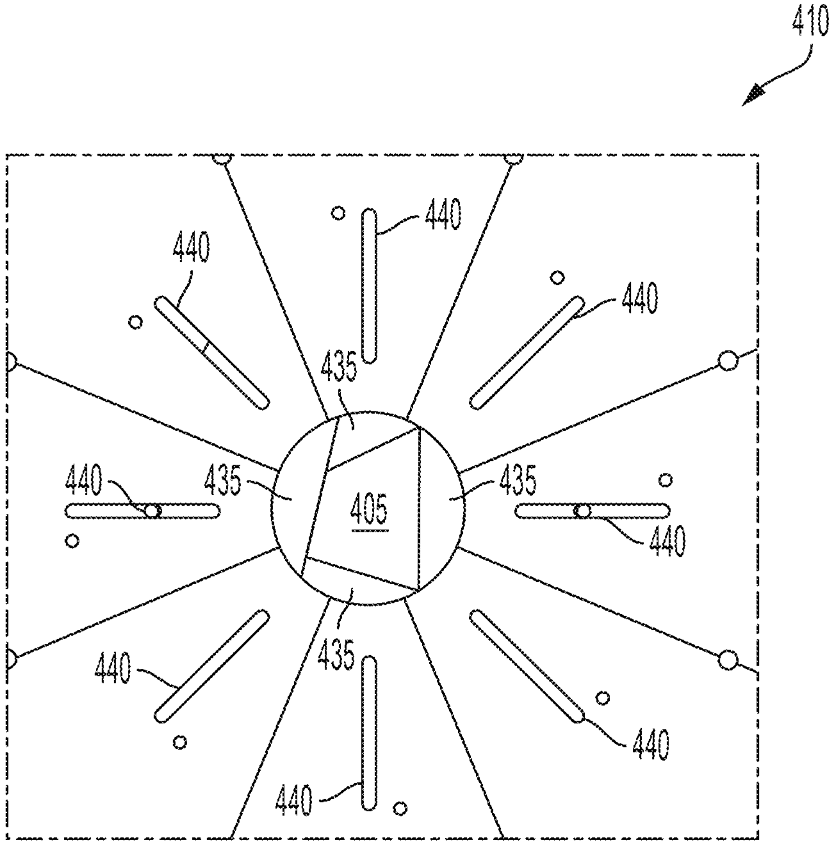
FIG. 4C illustrates a framing shutter gate, according to embodiments described herein.

FIG. 4C illustrates a detailed view of the partially closed framing shutter gate 405 including the framing shutter blades 435 and a plurality of indicators 440. The plurality of indicators represent the eight degrees of freedom for controlling the illustrated four framing shutter blades 435. In some embodiments, the framing shutter blades 435 include less than four framing shutter blades and therefore less than eight degrees of freedom. In some embodiments, the framing shutter blades 435 include more than four framing shutter blades and therefore more than eight degrees of freedom.

Figure 5:
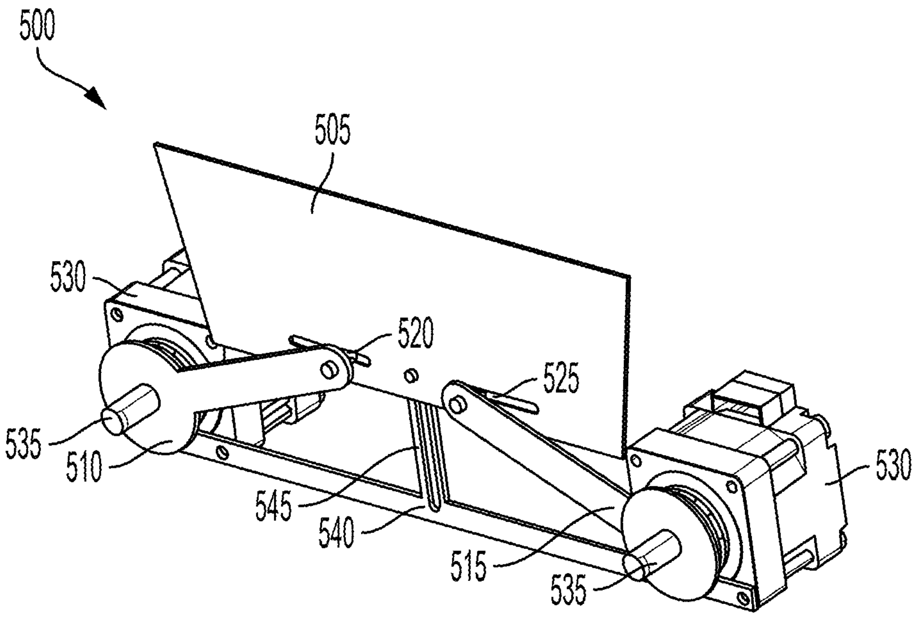
FIG. 5 illustrates a framing shutter blade system, according to embodiments described herein.

FIG. 5 illustrates a framing shutter blade system 500. The framing shutter blade system 500 includes a framing shutter blade 505, a first arm 510, a second arm 515, a first blade slot 520, a second blade slot 525, a plurality of framing shutter motors 530, and a support portion 540. The light fixture 100 would include, for example, four of the framing shutter blade systems 500 that can be individually controlled to achieve a desired shape for a gate (e.g., gate 405). The framing shutter blade 505 includes the first blade slot 520 and second blade slot 525. The first blade slot 520 and second blade slot 525 are configured to receive the first arm 510 and the second arm 515, respectively, in a slidable manner. The first arm 510 and second arm 515 each connect to one of the plurality of framing shutter motors 530 through an output shaft 535 of each of the plurality of framing shutter motors 530. In some embodiments, the first arm 510 and the second arm 515 are each one of the three bars in the three-bar frame. Each of the plurality of framing shutter motors 530 is at least partially fixed to the support portion 540. The support portion 540 further includes a track 545 configured to receive the framing shutter blade 505 in a slidable manner. In some embodiments, the track 545 is one of the three bars in the three-bar frame. As the plurality of framing shutter motors 530 are driven, the output shaft 535 of each of the plurality of framing shutter motors 530 rotate and cause the first arm 510 and the second arm 515 to rotate or pivot. The rotation of the first arm 510 and the second arm 515 may cause the relative positions of the first arm 510 and the second arm 515 within the first blade slot 520 and the second blade slot 525 respectively to be changed. As a result, an angle of the framing shutter blade 505 may change. The angle of the framing shutter blade is described in greater detail with respect to FIG. 6. Additionally, the rotation of the first arm 510 and the second arm 515 may cause the framing shutter blade 505 to slide up or down the track 545 of the support portion 540. Changing the relative position of the framing shutter blade 505 along the track 545 may change a thrust of the framing shutter blade 505. The thrust of the framing shutter blade is described in greater detail with respect to FIG. 6. The framing shutter blade system 500 is illustrated as an example shutter blade system. Other shutter blade systems that include different mechanical configurations can also be used in conjunction with forward and reverse kinematics and the cost function (described below) to control the operation of the particular shutter blade system.

Figure 6:
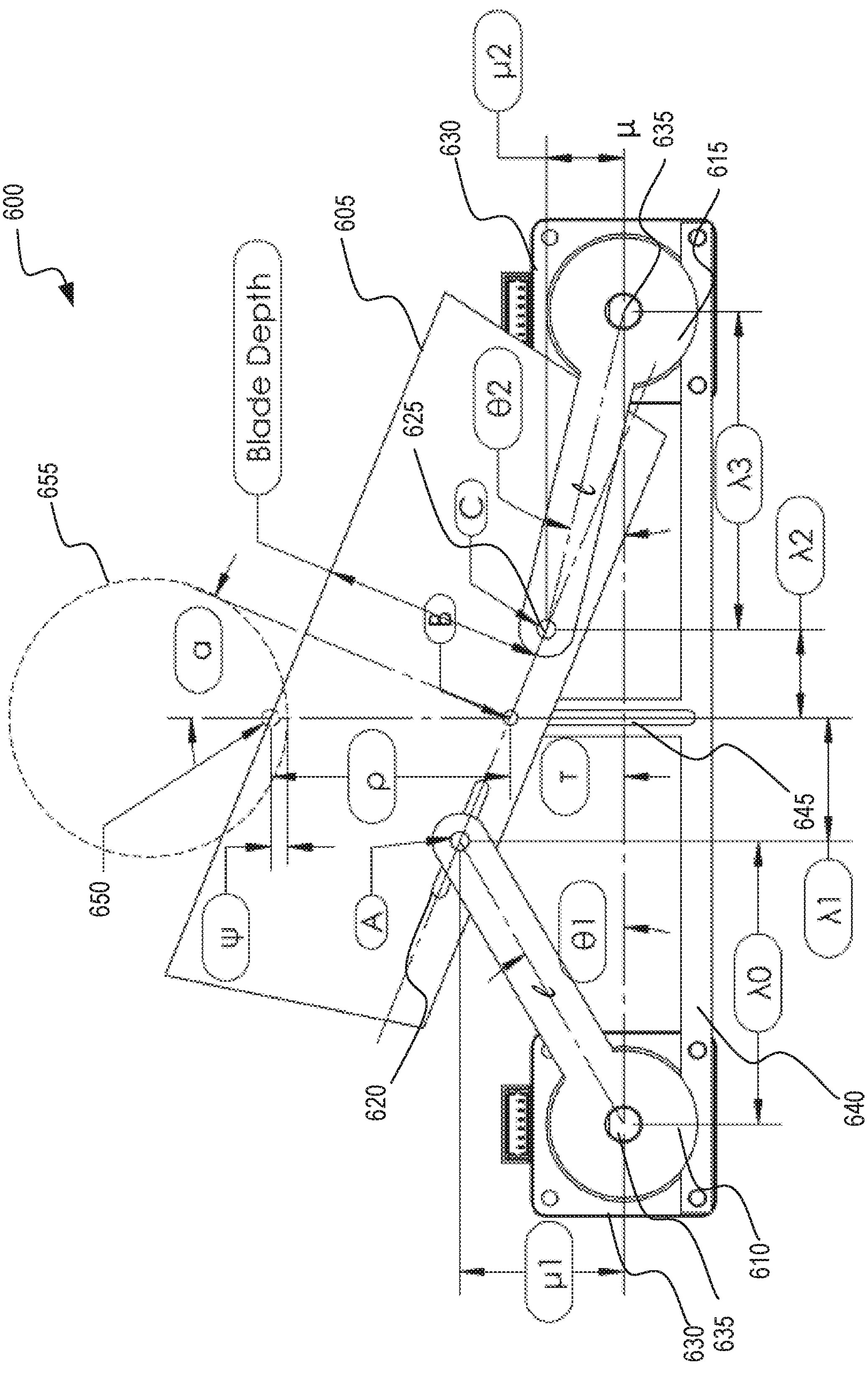
FIG. 6 illustrates a framing shutter blade system, according to embodiments described herein.

FIG. 6 illustrates a framing shutter blade system 600 in greater detail. The framing shutter blade system 600 includes a framing shutter blade 605, a first arm 610, a second arm 615, a first blade slot 620, a second blade slot 625, a plurality of framing shutter motors 630, and a support portion 640. The framing shutter blade 605 includes the first blade slot 620 and second blade slot 625. The first blade slot 620 and second blade slot 625 are configured to receive the first arm 610 and the second arm 615 in a slidable manner. The first arm 610 and second arm 615 each connect to one of the plurality of framing shutter motors 630 through an output shaft 635 of each of the plurality of framing shutter motors 630. Each of the plurality of framing shutter motors 630 is at least partially fixed to the support portion 640. The support portion 640 further includes a track 645 configured to receive the framing shutter blade 605 in a slidable manner. As the plurality of framing shutter motors 630 are driven, the output shaft 635 of each of the plurality of framing shutter motors 630 rotate and cause the first arm 610 and the second arm 615 to rotate. The rotation of the first arm 610 and the second arm 615 may cause the relative positions of the first arm 610 and the second arm 615 within the first blade slot 620 and the second blade slot 625 to respectively change.

As a result, an angle value $\alpha$ of the framing shutter blade 605 relative to a virtual pivot point 650 may change. The angle value $\alpha$ of the blade describes the rotation of the framing shutter blade 605 with respect to the virtual pivot point 650. The location of the virtual pivot point 650 does not change as the angle value $\alpha$ changes. The angle value $\alpha$ is measured in degrees. Additionally, the rotation of the first arm 610 and the second arm 615 may cause the framing shutter blade 605 to slide up or down the track 645 of the support portion 640. Changing the relative position of the framing shutter blade 605 along the track 645 may change a thrust value $\psi$ of the framing shutter blade 605. The thrust value w describes the location of the virtual pivot point 650 within a framing shutter gate 655. The thrust value $\psi$ may change as the framing shutter blade 605 moves along the track 645 and describes the position of virtual pivot point 650. In some embodiments, thrust is measured in millimeters of insertion into the framing shutter gate 655. When the thrust value $\psi$ equals zero, the virtual pivot point 650 coincides with a point on the edge of framing shutter gate 655. In some embodiments, the virtual pivot point 650 has a positive insertion wherein the virtual pivot point 650 is confined by the framing shutter gate 655 as represented in the current embodiment. In some embodiments, the virtual pivot point 650 has a negative insertion wherein the virtual pivot point 650 is outside of the framing shutter gate 655.

With respect to FIG. 6, the first arm 610 and the second arm 615 both have a length L. One output shaft 635 is horizontally displaced from a first point A by a first distance $\lambda_0$, and a second distance $\lambda_1$ describes the horizontal displacement from the first point A and a second point B. A third distance $\lambda_2$ describes the horizontal displacement between the second point B and the third point C, and the other output shaft 635 is displaced horizontally from a point C by a fourth distance $\lambda_3$. The first arm 610 is at a first angle $\theta_1$ relative to a horizontal axis μ that passes through the center of each output shaft 635, and the second arm 615 is at a second angle $\theta_2$ relative to the horizontal axis μ. The point A is vertically displaced from the axis μ by a first height $\mu_1$. The point C is vertically displaced from the axis μ by a second height $\mu_2$. A first height τ vertically separates the horizontal axis μ and the point B. A thrust induced angle ρ describes the distance the virtual pivot point 650 moves when the framing shutter blade 605 is rotated. The following equations describe the forward kinematic relationships between the above-noted parameters of the framing shutter blade system 600. First, A, B, and C point locations are determined.

$$\sin\theta = \frac{\mu}{L} \therefore \mu = L\sin\theta \quad \text{EQN. 1}$$

$$\cos\theta_1 = \frac{\lambda_0}{L} \therefore \lambda_0 = L\cos\theta_1 \quad \text{EQN. 2}$$

$$x_b = \lambda_1 + \lambda_0 \quad \text{EQN. 3}$$

$$x_b = L\cos\theta_1 + \lambda_1 \quad \text{EQN. 4}$$

$$\lambda_1 = x_b - L\cos\theta_1 \quad \text{EQN. 5}$$

$$\cos\theta_2 = \frac{\lambda_3}{L} \therefore \lambda_3 = L\cos\theta_2 \quad \text{EQN. 6}$$

$$x_b = \lambda_2 + \lambda_3 = \lambda_2 + L\cos\theta_2 \therefore \lambda_2 = x_b - L\cos\theta_2 \quad \text{EQN. 7}$$

Next, a slope m can be determined. The points A, B, and C are colinear. The coordinates for A ($x_a$, $y_a$), B ($x_b$, $y_b$), and C ($x_c$, $y_c$) can be written in terms of the symbols provided above.

$$x_a = \lambda_0 \quad \text{EQN. 8}$$

$$y_a = \mu_1 \quad \text{EQN. 9}$$

$$x_b = \lambda_0 + \lambda_1 \quad \text{EQN. 10}$$

$$y_b = \tau \quad \text{EQN. 11}$$

$$x_c = \lambda_0 + \lambda_1 + \lambda_2 \quad \text{EQN. 12}$$

$$y_c = \mu_2 \quad \text{EQN. 13}$$

The slope m created by points A, B, and C is:

$$m = \frac{y_c - y_a}{x_c - x_a} \quad \text{EQN. 14}$$

$$= \frac{\mu_2 - \mu_1}{(\lambda_0 + \lambda_1 + \lambda_2) - (\lambda_0)} \quad \text{EQN. 15}$$

$$= \frac{\mu_2 - \mu_1}{\lambda_1 + \lambda_2} \quad \text{EQN. 16}$$

The thrust of the B point (τ) and the angle (α) are given by:

$$\tau = m\lambda_1 + \mu_1 \quad \text{EQN. 17}$$

$$\tau = \left(\frac{\mu_2 - \mu_1}{\lambda_1 + \lambda_2}\right)\lambda_1 + \mu_1 \quad \text{EQN. 18}$$

$$\alpha = \arctan m \quad \text{EQN. 19}$$

Thrust (ψ) can then be determined:

$$\cos\alpha = \frac{\rho}{d} \therefore \rho = d\cos\alpha \quad \text{EQN. 20}$$

$$\psi = \tau + u + \left[\frac{d}{\cos\alpha} - d\right] \quad \text{EQN. 21}$$

where ρ is the distance that the virtual pivot point 650 moves when the blade 605 is rotated, and is a function of the angle α blade depth d. The extra −d is added to factor blade depth out of the offset since it is a constant.

The above-noted equations that describe the forward kinematic relationships between the above-noted parameters are transcendental. The analytical solution is not tractable (i.e., a non-analytic solution is required). A solver (e.g., a non-analytical solver) can be used to solve for the first angle $\theta_1$ and the second angle $\theta_2$ of the first arm 610 and the second arm 615, respectively, given values for the angle α and the thrust ψ. The parameters used by the non-analytical solver to determine the first angle $\theta_1$ and the second angle $\theta_2$ are described with respect to FIGS. 7A and 7B.

Figure 7A:
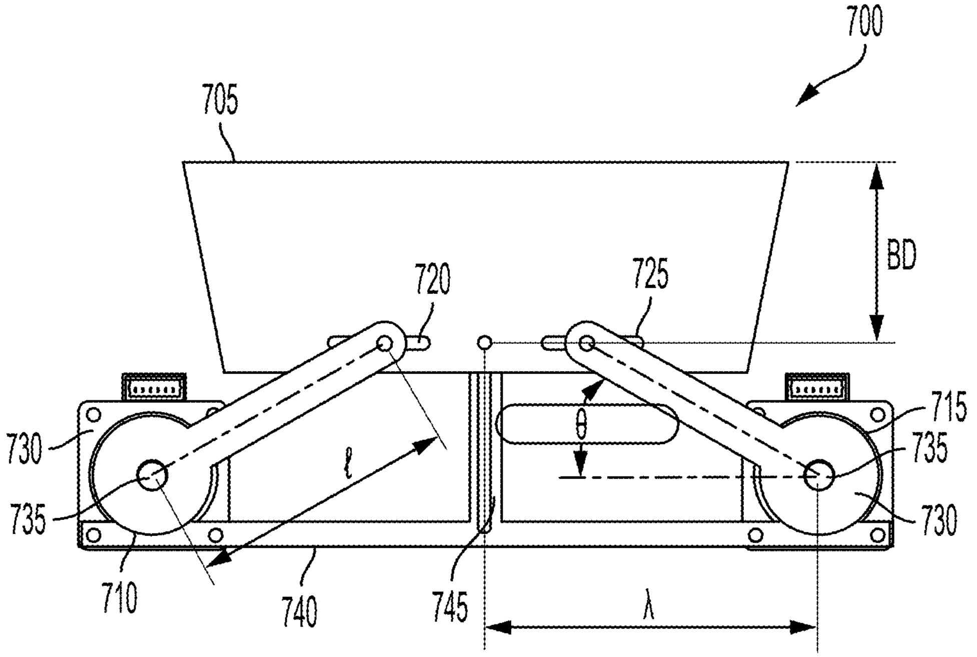
FIG. 7A illustrates a framing shutter blade system, according to embodiments described herein.
Figure 7B:
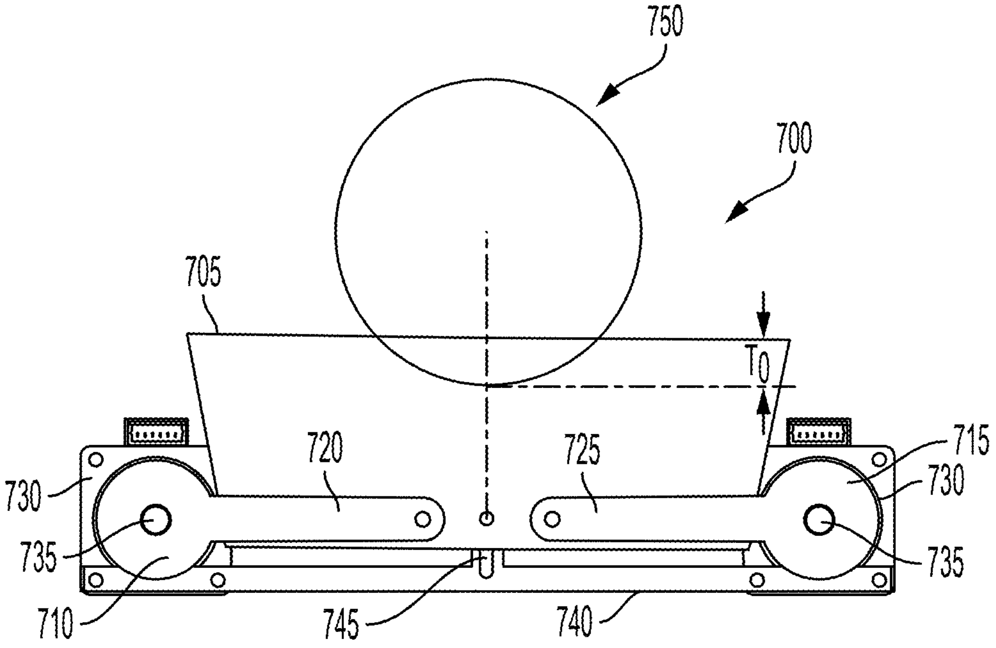
FIG. 7B illustrates a framing shutter blade system, according to embodiments described herein.

FIG. 7A illustrates a framing shutter blade system 700 with a non-zero thrust. FIG. 7B illustrates a framing shutter blade system with a zero angle and a thrust at zero millimeters. With respect to FIGS. 7A and 7B, the framing shutter blade system 700 includes a framing shutter blade 705, a first arm 710, a second arm 715, a first blade slot 720, a second blade slot 725, a plurality of framing shutter motors 730, and a support portion 740. The framing shutter blade 705 includes the first blade slot 720 and second blade slot 725. The first blade slot 720 and second blade slot 725 are configured to receive the first arm 710 and the second arm 715 in a sliding manner. The first arm 710 and second arm 715 each connect to one of the plurality of framing shutter motors 730 through an output shaft 735 of each of the plurality of framing shutter motors 730. Each of the plurality of framing shutter motors 730 is at least partially fixed to the support portion 740. The support portion 740 further includes a track 745 configured to receive the framing shutter blade 705 in a sliding manner.

The first arm 710 and the second arm 715 in FIG. 7A have a non-zero arm angle θ. The plurality of framing shutter motors 730 rotates the first arm 710 and the second arm 715 by rotating the output shaft 735 of each of the plurality of framing shutter motors 730 to achieve the arm angle θ. The rotation of the first arm 710 and the second arm 715 by the arm angle θ causes the relative positions of the first arm 710 and the second arm 715 within the first blade slot 720 and the second blade slot 725, respectively, to change. As a result, a non-zero thrust of the framing shutter blade 705 is established. Additionally, the rotation of the first arm 710 and the second arm 715 causes the framing shutter blade 705 to slide up the track 745 of the support portion 740. A midpoint distance λ refers to the horizontal distance between a vertical axis that passes through the output shaft 735 and a vertical axis that passes through the track 745 of the support portion 740. Framing shutter blade 705 also has a blade depth BD. The blade depth BD refers to the vertical distance between the top of the framing shutter blade 705 and a horizontal axis that passes through the first blade slot 720 and the second blade slot 725.

The first arm 710 and the second arm 715 in FIG. 7B have an arm angle of zero degrees. Additionally, a thrust at zero degrees $T_0$ refers to a thrust of the framing shutter blade into a framing shutter gate 750 when the first arm 710 and the second arm 715 both have an arm angle of zero degrees. The arm angle θ has a minimum arm angle and a maximum arm angle that describe the limits for the range of motion of the first arm 710 and the second arm 715. In some embodiments, the blade depth BD, the midpoint distance λ, the thrust at zero degrees $T_0$, the minimum arm angle, and the maximum arm angle are the initial parameters used by the non-analytical solver to solve for the arm angle θ.

An example of a non-analytical solver that can be used to solve for the first angle $\theta_1$ and the second angle $\theta_2$ is a gradient descent algorithm. The gradient descent algorithm finds a solution by iteratively moving a guessed solution in all direction on a cost plane, and then moves in the direction that reduces a cost the most. The cost is calculated by, for example, subtracting a current shutter blade position (calculated with the above forward kinematics) from a target position, as set forth below.

$$e_\psi = \psi_{target} - \psi(\theta_1, \theta_2) \quad \text{EQN. 22}$$

$$e_\alpha = (\alpha_{target} - \alpha(\theta_1, \theta_2))\omega \quad \text{EQN. 23}$$

$$C = \sqrt{(e_\psi^2 + e_\alpha^2)} \quad \text{EQN. 24}$$

In the above equations, cost is represented by C, the distance between the target thrust value and the thrust value is represented by $e_\psi$, and the distance between the target angle value and the angle value is represented by $e_\alpha$. Additionally, ω represents an angle-thrust weight. When the angle-thrust weight is less than 1, the thrust value is proportionally given a larger priority. When the angle-thrust weight is greater than 1, and the angle is proportionally given a larger priority. When the angle-thrust weight is equal to 1, the thrust value and the angle value are given the same priority.

The cost function provided above is only an example of a cost function that could be used. However, the example cost function is the Euclidean norm, which increases with the distance between the target point and the current point. As a result, the cost function guarantees that the solution for an out of gamut thrust-angle request will be as close as possible to the target.

Figure 8:
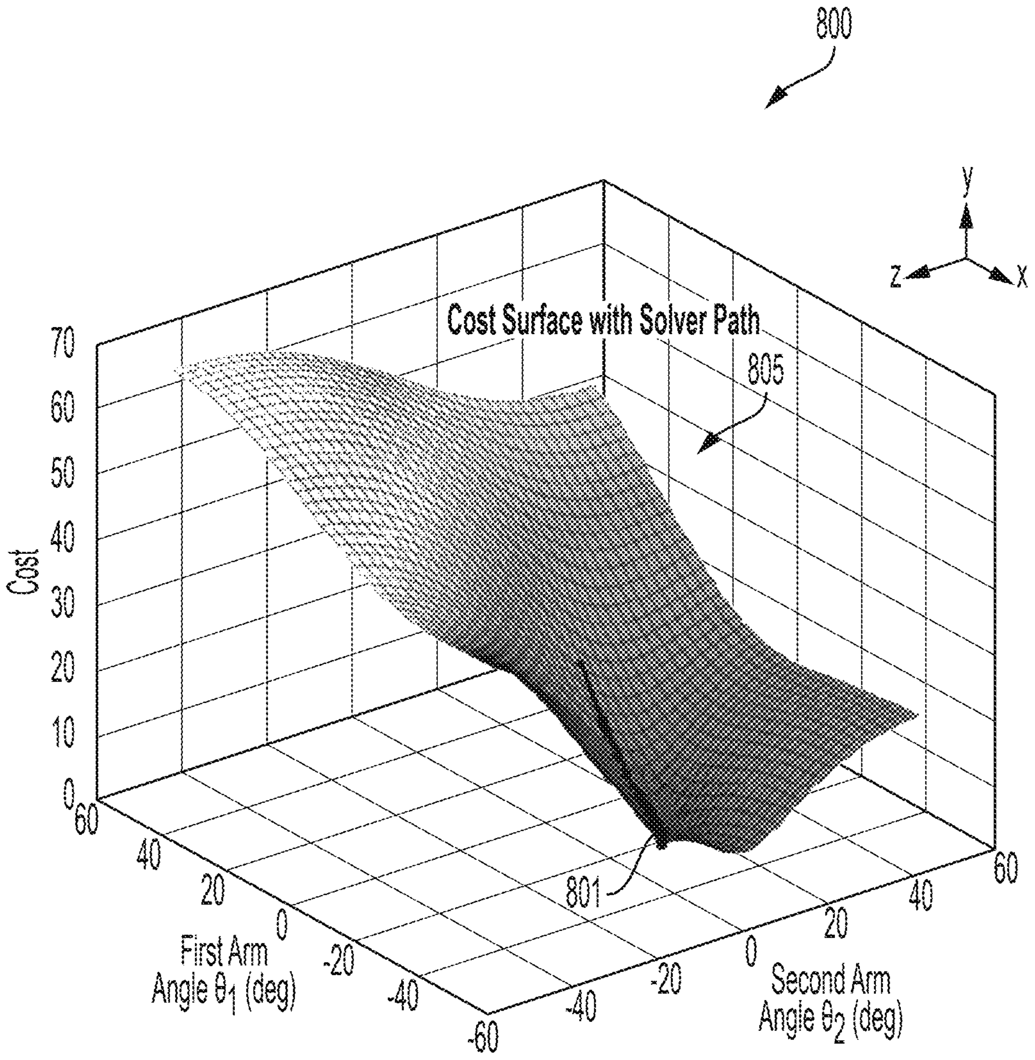
FIG. 8 illustrates a graph of a cost surface with a solver path, according to embodiments described herein.

FIG. 8 illustrates a graph 800 of a cost surface 805 for the above cost function. The graph 800 includes a y-axis, z-axis, and x-axis. The y-axis shows the value of the cost function, while the z-axis (left) and x-axis (right) show $\theta_1$ and $\theta_2$, respectively. The cost surface 805 includes a solver path 810. As previously described, a non-analytical solver can be used to solve the inverse kinematics and determine the first angle $\theta_1$ and the second angle $\theta_2$ of a first arm (e.g., first arm 610) and a second arm (e.g., second arm 615), respectively, for a given thrust and angle. The non-analytical solver uses an initial set of parameters in order to solve for the first angle $\theta_1$ and the second angle $\theta_2$. In some embodiments, a blade depth, a midpoint distance, a thrust at zero degrees, a minimum arm angle, and a maximum arm angle are the initial set of parameters. The non-analytical solver also uses an angle value (e.g., angle value α) and a thrust value (e.g., thrust value ψ) as inputs.

In the current example, the initial guessed solution of the gradient descent algorithm is $\theta_1=\theta_2=0$ such that thrust is 20 millimeters and the angle is 25 degrees. The non-analytical solver then calculates the slope from the guessed solution to all values of $\theta_1$ and $\theta_2$ in every direction. The non-analytical solver determines the greatest negative slope and moves the guessed solution to the next values of $\theta_1$ and $\theta_2$. This process is iterated until the lowest cost value of the cost function surface is reached. The solver path 810 indicates the path taken by the non-analytical solver starting from the initial guess and ending at the lowest cost value of the cost function surface. In some embodiments, the lowest cost value on the cost function surface corresponds to a closest in-gamut output value for both $\theta_1$ and $\theta_2$ for an out-of-gamut input value for the thrust value and the angle value.

Figure 9:
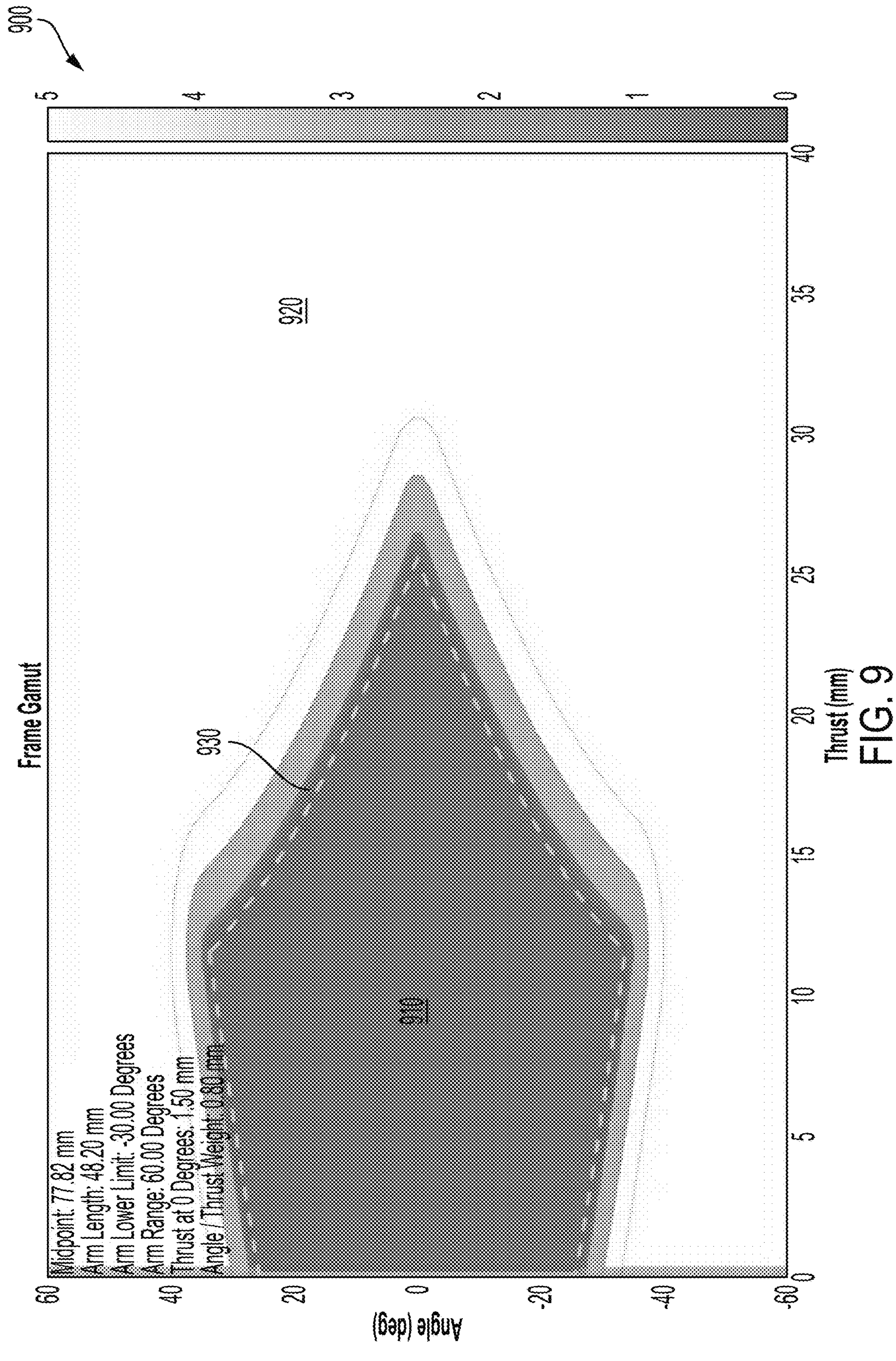
FIG. 9 illustrates a gamut chart of a framing shutter blade, according to embodiments described herein.

FIG. 9 illustrates a gamut chart 900 of a framing shutter blade (e.g., framing shutter blade 605). The gamut chart 900 provides a range of motion of a framing shutter blade that can be achieved for a given angle and thrust. The gamut chart 900 includes an in-gamut region 910, an out-of-gamut region 920, and a boundary 930. In-gamut region 910 represents orientations which a framing shutter blade can physically achieve given the range of motion of the framing shutter blade. The out-of-gamut region 920 represents orientations which a framing shutter blade cannot physically achieve given the range of motion of the framing shutter blade. The boundary 930 represents the border of orientations achievable by a framing shutter blade. The cost function described above is designed to identify an achievable orientation (in-gamut region 910) for an out-of-gamut request (e.g., out-of-gamut region 920) that is as close as possible to the out-of-gamut request.

Figure 10:
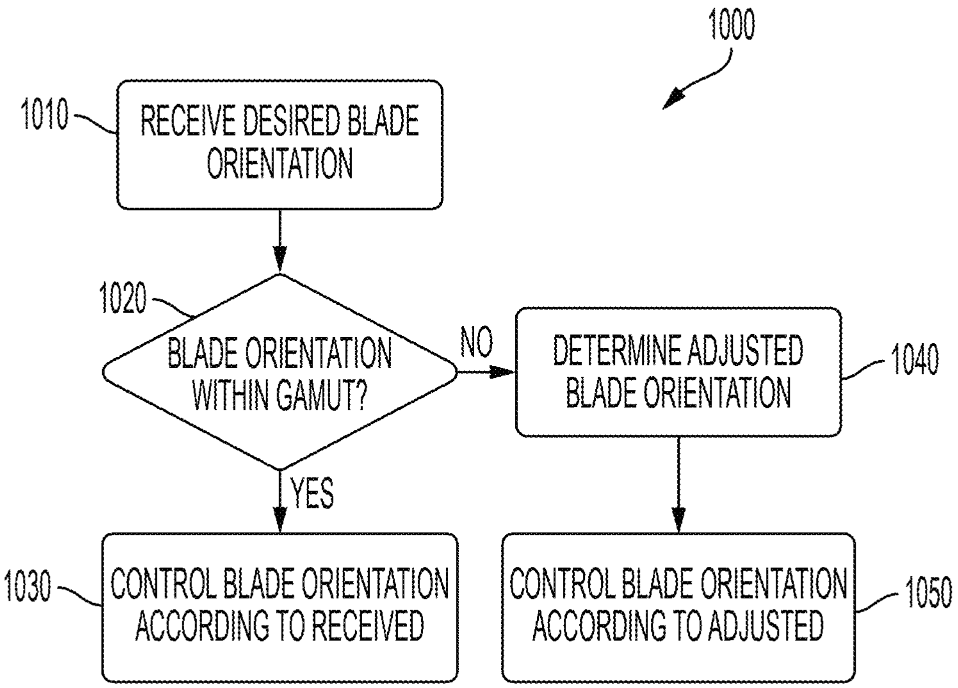
FIG. 10 illustrates a process for controlling the light fixture of FIG. 1, according to embodiments described herein.

FIG. 10 illustrates a method 1000 for controlling the light fixture 100. The method 1000 is initiated when the controller 300 receives a desired orientation of a framing shutter blade (e.g., framing shutter blade 605) (STEP 1010). After receiving the desired orientation (e.g., thrust and angle) of the framing shutter blade, the controller 300 determines whether the desired orientation is in a gamut (e.g. in-gamut region 910) of the framing shutter blade (STEP 1020). When the desired orientation of the framing shutter blade is deemed to be in the gamut of the framing shutter blade, the controller controls the orientation of the framing shutter blade according to the received desired orientation of the framing shutter blade (STEP 1030). When the desired orientation of the framing shutter blade is deemed to be outside the gamut of the framing shutter blade, the controller determines an adjusted orientation of the framing shutter blade (STEP 1040). As described above, a solver (e.g., the non-analytical solver) can be used to adjust the orientation of the framing shutter blade to be within the gamut of the framing shutter blade. The controller 300 then controls the orientation of the framing shutter blade according to the adjusted orientation of the framing shutter blade (STEP 1050).

In some embodiments, STEP 1040 also includes receiving a desired angle-thrust weight (see EQN. 23 above). When the angle-thrust weight is greater than 1, the angle is proportionally given a larger priority. When the angle-thrust weight is less than 1, the thrust is proportionally given a larger priority. When the angle-thrust weight is equal to 1, the thrust value and the angle value are given the same priority.

Figure 11A:
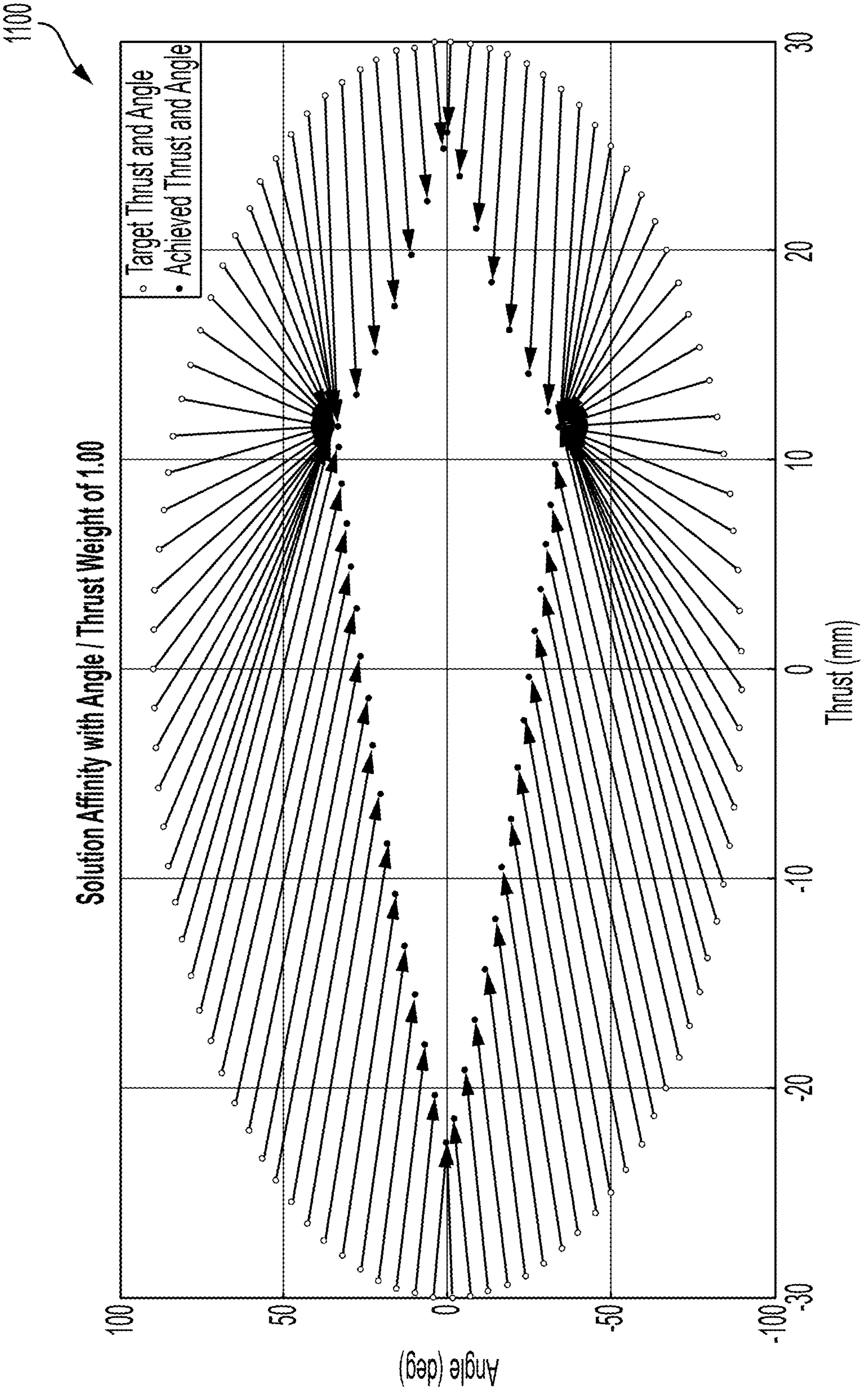
FIG. 11A illustrates a graph of a target thrust and angle and an achieved thrust and angle according to a thrust-angle weight, according to embodiments described herein.

For example, FIG. 11A illustrates a graph 1100 of target thrusts and target angles and an achievable thrusts and achievable angles according to a weight that equally prioritizes achieving the angle value and the thrust value. In this example, the angle-thrust weight (e.g., angle-thrust weight ω) is set to equal 1.00. In some embodiments, the angle-thrust weight is user selection through a user interface (e.g., user input module 325). In some embodiments, the angle-thrust weight is automatically selectable (e.g., stored in memory 360). Assigning equal priority to the angle value and the thrust value results in the cost function determining angle values that are at least slightly different from the target angle values and thrust values that are at least slightly different from the target thrust values with no emphasis on one over the other.

Figure 11B:
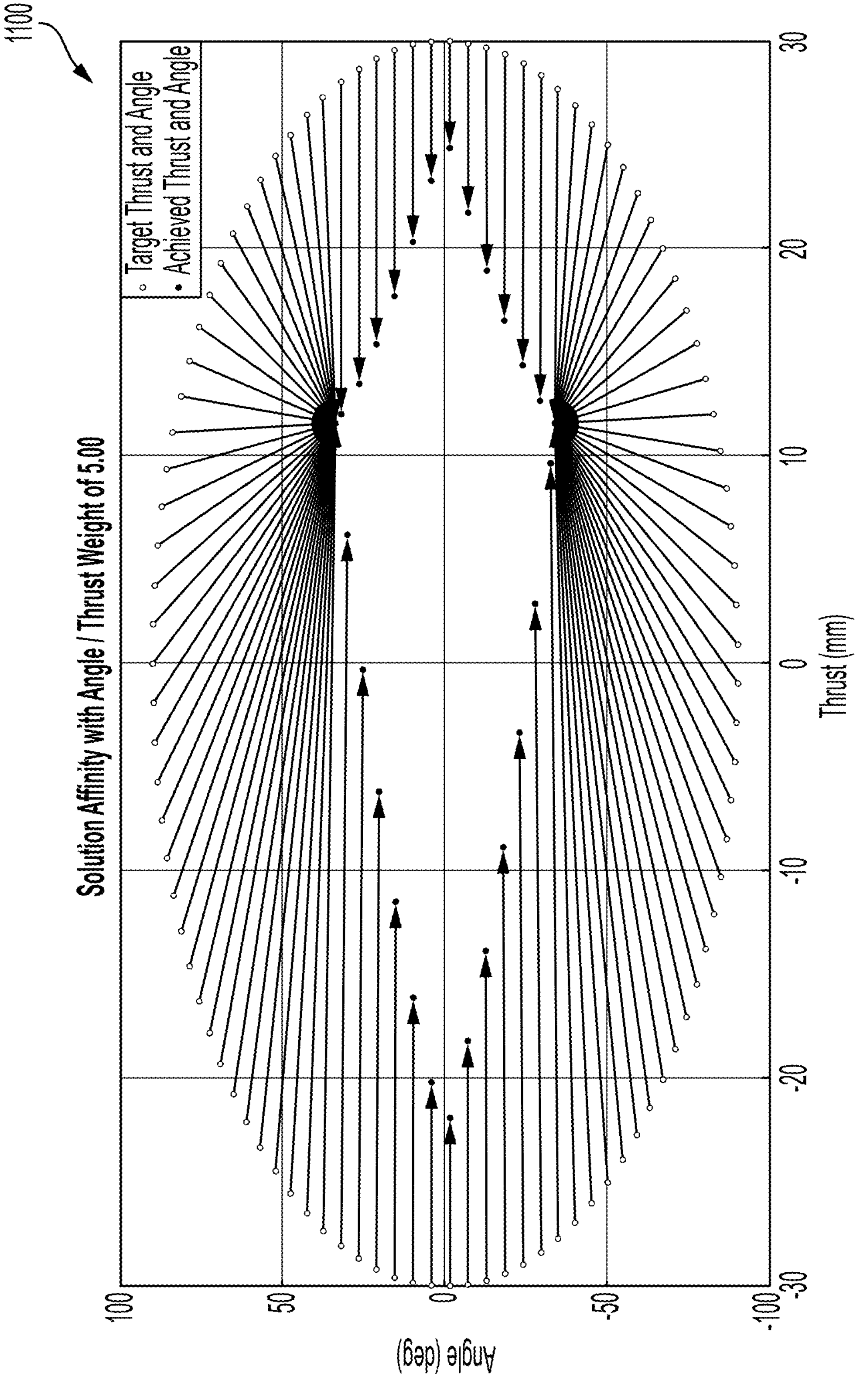
FIG. 11B illustrates a graph of a target thrust and angle and an achieved thrust and angle according to a thrust-angle weight, according to embodiments described herein.
Figure 11C:
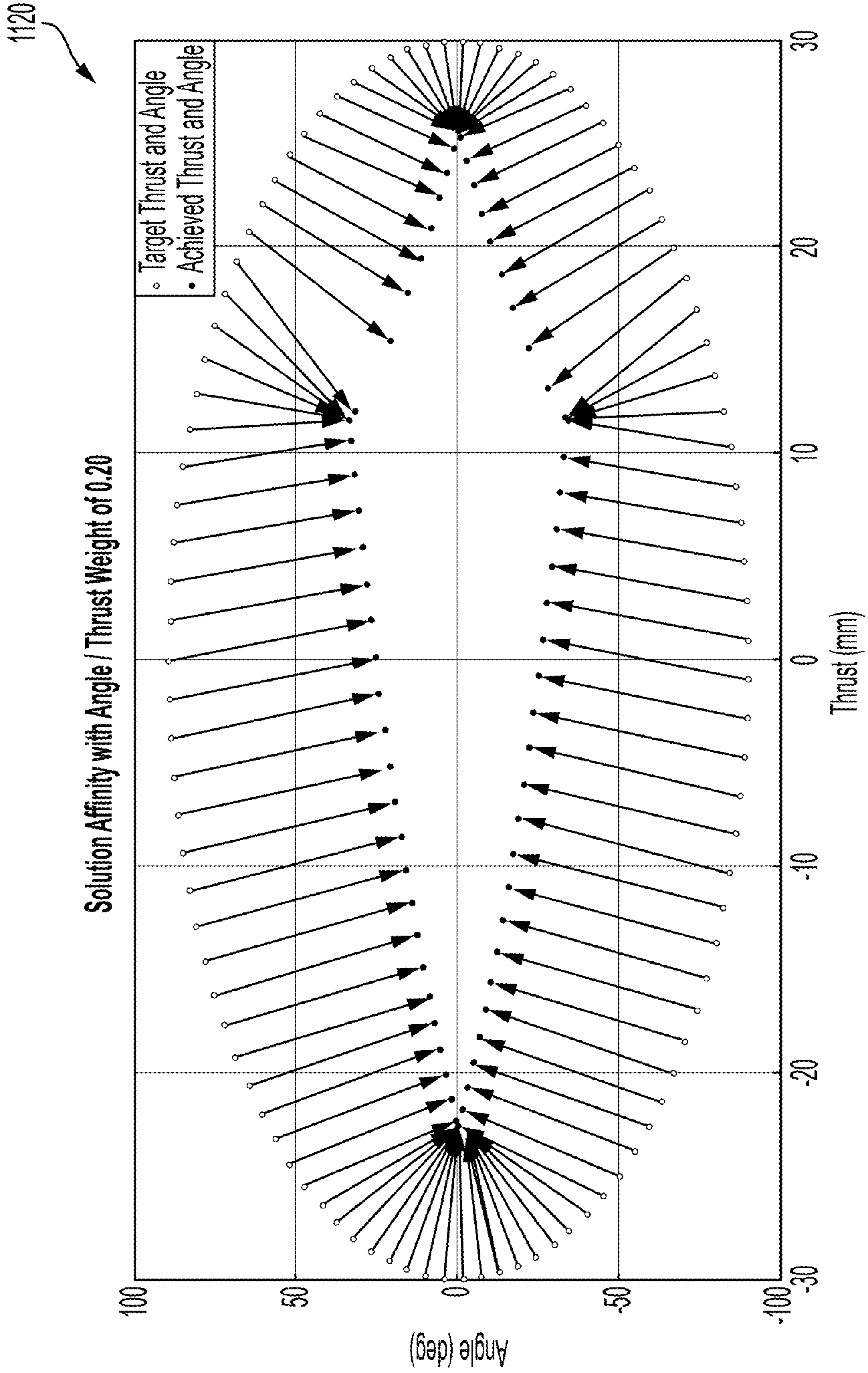
FIG. 11C illustrates a graph of a target thrust and angle and an achieved thrust and angle according to a thrust-angle weight, according to embodiments described herein.

FIGS. 11B and 11C illustrate the effects of prioritizing either achieving the angle value or achieving the thrust value. FIG. 11B illustrates a graph 1110 of target thrusts and target angles and an achievable thrusts and achievable angles according to a weight that prioritizes the angle value. In this example, the angle-thrust weight (e.g., angle-thrust weight @) is set to equal 5.00. At this angle-thrust weight, the angle value is prioritized over the thrust value. Prioritizing the angle value over the thrust value causes a greater number of the achievable angle values to be equal to the target angle values in comparison to the target angle values and achievable angle values when the angle value and thrust value are prioritized equally. Note that the lines pointing from target positions to actual positions have become more horizontal, which is a result of the solver being more willing to travel away from a target thrust to achieve the target angle.

FIG. 11C illustrates a graph 1120 of target thrusts and target angles and an achievable thrusts and achievable angles according to a weight that prioritizes the thrust value. In this example, the angle-thrust weight (e.g., angle-thrust weight ω) is set to equal 0.20. At this angle-thrust weight, the thrust value is prioritized over the angle value. Prioritizing the thrust value over the angle value causes a greater number of the achievable thrust values to be equal to the target thrust values in comparison to the target thrust values and achievable thrust values when the angle value and thrust value are prioritized equally. Note that the lines pointing from target positions to actual positions have become more vertical, which is a result of the solver being more willing to travel away from a target angle to achieve the target thrust.

Thus, embodiments described herein provide, among other things, light fixtures and methods for controlling the same. Various features and advantages are set forth in the following claims.

What is claimed is:

1. A light fixture comprising:
- a housing;
- a light source;
- a framing shutter system including:
  - a framing shutter gate,
  - a framing shutter blade, and
  - a plurality of framing shutter motors connected to the framing shutter blade; and
- an electronic processor electrically connected to the light source and the framing shutter system, the electronic processor configured to:
  - determine a desired orientation of the framing shutter blade,
  - determine whether the desired orientation is within a gamut of the framing shutter blade,
  - determine, in response to the desired orientation being outside of the gamut of the framing shutter blade, an adjusted orientation of the framing shutter blade, the adjusted orientation of the framing shutter blade corresponding to an orientation for the framing shutter blade that is as close as possible to the desired orientation, and
  - control the plurality of framing shutter motors to move the framing shutter blade to the adjusted orientation.

2. The light fixture of claim 1, wherein the desired orientation of the framing shutter blade is defined by a thrust value and an angle value.

3. The light fixture of claim 2, wherein the thrust value corresponds to a location of a virtual pivot point within the framing shutter gamut.

4. The light fixture of claim 2, wherein the angle value corresponds to how far the framing shutter blade is rotated about a virtual pivot point.

5. The light fixture of claim 2, wherein the angle value is assigned an angle-thrust weight.

6. The light fixture of claim 5, wherein the angle-thrust weight is user selectable.

7. The light fixture of claim 5, wherein the angle-thrust weight is automatically selected.

8. A method for controlling a light fixture, the method comprising:
- determining, using an electronic processor, a desired orientation of a framing shutter blade;
- determining, using the electronic processor, whether the desired orientation is within a gamut of the framing shutter blade;
- determining, using the electronic processor and in response to the desired orientation being outside of the gamut of the framing shutter blade, an adjusted orientation of the framing shutter blade, the adjusted orientation of the framing shutter blade corresponding to an orientation for the framing shutter blade that is as close as possible to the desired orientation; and
- controlling, using the electronic processor, a plurality of framing shutter motors to move the framing shutter blade to the adjusted orientation.

9. The method of claim 8, wherein the desired orientation of the framing shutter blade is defined by a thrust value and an angle value.

10. The method of claim 9, wherein the thrust value corresponds to a location of a virtual pivot point within a framing shutter gate.

11. The method of claim 9, wherein the angle value corresponds to how far the framing shutter blade is rotated about a virtual pivot point.

12. The method of claim 9, wherein the angle value is assigned an angle-thrust weight.

13. The method of claim 12, wherein the angle-thrust weight is user selectable.

14. The method of claim 12, wherein the angle-thrust weight is automatically selected.

15. The method of claim 8, wherein the electronic processor further configured to determine the adjusted orientation using a non-analytical solver.

16. The method of claim 15, wherein the non-analytical solver is configured to minimize a cost function when determining the adjusted orientation.

17. The method of claim 16, wherein the non-analytical solver is a gradient descent algorithm.

18. A light fixture comprising:
- a housing;
- a light source;

a framing shutter blade system including:
a first arm,
a second arm,
a framing shutter blade including a first blade slot configured to receive the first arm in a slidable manner and a second blade slot configured to receive the second arm in a slidable manner,
a first framing shutter motor including a first output shaft, the first framing shutter motor being connected to the first arm via the first output shaft, and
a second framing shutter motor including a second output shaft, the second framing shutter motor being connected to the second arm via the second output shaft; and
an electronic processor electrically connected to the light source and the framing shutter blade system, the electronic processor configured to:
receive a desired angle of the framing shutter blade,
receive a desired thrust of the framing shutter blade,
determine a desired orientation based on the desired angle and the desired thrust,
determine whether the desired orientation is within a gamut of the framing shutter blade,
determine, in response to the desired orientation being outside of the gamut of the framing shutter blade, an adjusted orientation of the framing shutter blade, the adjusted orientation of the framing shutter blade corresponding to an orientation for the framing shutter blade that is as close as possible to the desired orientation, and
adjust the first arm and the second arm by controlling the first framing shutter motor and the second framing shutter motor to move the framing shutter blade to the adjusted orientation.

19. The light fixture of claim 18, wherein the electronic processor is further configured to assign an angle-thrust weight to the desired angle of the framing shutter blade.

20. The light fixture of claim 19, wherein the angle-thrust weight is automatically selected.

* * * * *